US007657230B2

(12) United States Patent
Rowitch

(10) Patent No.: US 7,657,230 B2
(45) Date of Patent: *Feb. 2, 2010

(54) PROCEDURE FOR DETECTING INTERFERING MULTI-PATH CONDITION

(75) Inventor: Douglas N. Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

This patent is subject to a terminal disclaimer.

(21) Appl. No.: 10/233,096

(22) Filed: Aug. 29, 2002

(65) Prior Publication Data

US 2004/0043726 A1 Mar. 4, 2004

(51) Int. Cl.
*H04B 1/00* (2006.01)
*H04B 17/00* (2006.01)

(52) U.S. Cl. .................. 455/65; 455/63.1; 455/67.11; 375/254

(58) Field of Classification Search .................. 455/69, 455/522, 524, 65, 67.11, 63.11, 63.1; 375/254, 375/346
See application file for complete search history.

(56) References Cited

U.S. PATENT DOCUMENTS 5,692,008 A * 11/1997 Van Nee ...................... 375/148

| 5,982,811 | A | * | 11/1999 | Harrison et al. ............. 375/150 |
| 6,047,017 | A | * | 4/2000 | Cahn et al. .................. 375/148 |
| 6,313,786 | B1 | * | 11/2001 | Sheynblat et al. ...... 342/357.02 |
| 6,614,244 | B2 | | 9/2003 | Yamada et al. |
| 6,987,820 | B1 | * | 1/2006 | Brenner ....................... 375/343 |
| 7,096,132 | B2 | * | 8/2006 | Patrick et al. ................. 702/66 |
| 2002/0050944 | A1 | | 5/2002 | Sheynblat et al. |
| 2003/0008622 | A1 | | 1/2003 | Fernandez-Corbaton et al. |

FOREIGN PATENT DOCUMENTS

| JP | 08-293852 | 11/1996 |
| JP | 2001-008907 | 1/2001 |
| WO | 00045191 | 8/2000 |

OTHER PUBLICATIONS

International Search Report PCT/US2003/027180, International Search Authority European Patent Office Apr. 19, 2004.
International Preliminary Examination Report PCT/US2003/027180, International Search Authority US Jun. 29, 2006.

* cited by examiner

*Primary Examiner*—Yuwen Pan
(74) *Attorney, Agent, or Firm*—Bruce Greenhaus; Shyam K. Parekh

(57) ABSTRACT

A method of and system for detecting an interfering multi-path condition is provided. A parameter is determined from a pulse of a correlation function derived from a received signal. The parameter is examined to determine if it is inconsistent with a non-interfering multi-path hypothesis. If so, an interfering multi-path condition is detected.

26 Claims, 12 Drawing Sheets

```
           const fpRatioLim fpQuadLims[] = (
802a ─────── {1.85145,   2.80786},
802b ─────── {1.69355,   2.75508},
802c ─────── {1.57201,   2.61058},
            {1.49738,   2.44450},
            {1.44353,   2.36501},
            {1.39254,   2.29974},
            {1.35144,   2.23000},
            {1.32177,   2.19224},
            {1.30608,   2.18367},
            {1.29559,   2.20349},
            {1.29162,   2.21340},
            {1.30278,   2.26010},
            {1.32546,   2.28749},
            {1.35356,   2.35823},
            {1.39718,   2.46252},
            {1.45234,   2.54769},
            {1.52013,   2.74392},
            {1.61011,   2.95576},
            {1.74183,   3.15445},
            {1.94049,   3.16019}
```

FIGURE 8

```
const fpRatioLim fpRatioLim[][8] = {
    {(19.23440, 23.18000), (18.32050, 23.32000), ( 7.18885, 12.61015), ( 0.00000,  0.63130)},
    {( 8.36310, 22.47000), ( 7.38475, 23.23000), ( 6.22585, 23.14000), ( 6.25250, 23.24000)},
    {(19.47160, 23.46000), (19.01100, 23.52000), ( 7.91220, 13.70220), ( 0.00000,  1.30870)},
    {( 7.86635, 18.59000), ( 7.97225, 23.39000), ( 6.39300, 23.35000), ( 6.31450, 23.38000)},
    {(19.61270, 23.54000), (19.31760, 23.86000), ( 8.92600, 16.45000), ( 0.00000,  1.94855)},
    {( 7.48590, 16.49000), ( 8.36985, 23.57000), ( 6.67115, 23.57000), ( 6.68060, 23.63000)},
    {(19.73510, 23.87000), (19.92125, 23.84000), ( 9.69325, 17.77000), ( 0.74300,  2.57580)},
    {( 6.77880, 12.29640), ( 8.82100, 23.88000), ( 6.94675, 23.67000), ( 6.82870, 23.77000)},
    {(19.86870, 23.96000), (19.98555, 23.91000), (10.35535, 19.75000), ( 1.07955,  3.07215)},
    {( 6.45185, 11.26115), ( 9.17865, 23.79000), ( 6.99580, 23.81000), ( 6.96175, 23.83000)},
    {(19.93645, 24.15000), (20.11635, 24.06000), (10.81095, 22.03000), ( 1.44935,  3.51845)},
    {( 5.92875, 10.12125), ( 9.70125, 23.99000), ( 7.10050, 23.98000), ( 6.99775, 24.04000)},
    {(20.04005, 24.19000), (20.58625, 24.06000), (11.55605, 23.30000), ( 1.80770,  3.98130)},
    {( 5.34765,  9.19165), (10.00390, 24.14000), ( 7.25295, 23.94000), ( 7.17235, 24.07000)},
    {(19.90795, 24.17000), (20.71770, 24.24000), (12.11750, 23.93000), ( 2.-1285,  4.41095)},
    {( 4.41985,  8.22715), (10.47755, 24.23000), ( 7.36475, 24.08000), ( 7.-2225, 24.18000)},
    {(20.17220, 24.20000), (21.02900, 24.11000), (12.59685, 24.11000), ( 2.45695,  4.84815)},
    {( 3.80255,  7.39065), (10.96125, 24.16000), ( 7.44280, 24.14000), ( 7.20475, 24.23000)},
    {(20.27190, 24.28000), (10.79695, 24.17000), (13.05155, 24.16000), ( 2.68485,  5.23805)},
    {( 3.37870,  6.63790), (11.24275, 24.19000), ( 7.43270, 24.08000), ( 7.21495, 24.22000)},
    {(20.04950, 24.24000), (21.18465, 24.10000), (13.60825, 24.16000), ( 2.96515,  5.86035)},
    {( 2.94570,  5.90470), (11.39475, 24.24000), ( 7.55735, 24.19000), ( 7.27600, 24.14000)},
    {(20.15080, 24.17000), (20.81625, 24.05000), (15.06630, 24.20000), ( 3.30570,  6.42610)},
    {( 2.57950,  5.19010), (11.23360, 24.19000), ( 7.44750, 24.21000), ( 7.17240, 24.09000)},
    {(20.17210, 24.13000), (20.68320, 24.12000), (15.74775, 24.16000), ( 3.66130,  7.06390)},
    {( 2.17615,  4.65275), (11.19125, 24.08000), ( 7.54245, 24.12000), ( 7.07475, 24.07000)},
    {(19.98960, 24.09000), (20.82400, 24.01000), (16.18525, 24.13000), ( 4.00945,  7.71105)},
    {( 1.84430,  4.20050), (11.17000, 24.12000), ( 7.45265, 24.04000), ( 7.13905, 24.15000)},
    {(19.93060, 24.02000), (20.57700, 23.97000), (16.41770, 23.99000), ( 4.63000,  8.35400)},
    {( 1.44875,  3.74375), (11.44330, 24.10000), ( 7.64650, 23.93000), ( 7.06575,  7.06390)},
    {(19.86020, 23.93000), (20.45240, 23.91000), (16.83200, 23.85000), ( 7.05390,  9.01775)},
    {( 1.10200,  3.22600), (11.08345, 23.75000), ( 7.46810, 23.81000), ( 5.37565,  7.06390)},
    {(19.89175, 23.79000), (10.38975, 23.65000), (17.05000, 23.71000), ( 6.82820,  9.69630)},
    {( 0.00000,  2.52250), (10.68965, 23.76000), ( 7.47315, 23.76000), ( 5.76610,  9.63000)},
    {(19.53555, 23.60000), (20.03215, 23.55000), (17.38675, 23.50000), ( 6.71585, 10.44355)},
    {( 0.00000,  1.95790), (20.03215, 23.36000), ( 7.31730, 23.52000), ( 6.11345, 23.46000)},
    {(19.27100, 23.58000), (19.67605, 23.50000), (17.82530, 23.41000), ( 6.64530, 11.29955)},
    {( 0.00000,  1.29125), ( 9.43465, 22.92000), (17.82530, 23.22000), ( 6.31830, 23.29000)},
    {(19.31680, 23.26000), (19.51450, 23.26000), (18.04300, 23.22000), ( 6.79625, 11.78065)},
    {( 0.00000,  0.58915), ( 8.76585, 22.74000), ( 7.24565, 23.45000), ( 6.23875, 23.15000)}
};
```

FIGURE 9

PROCEDURE FOR DETECTING INTERFERING MULTI-PATH CONDITION

FIELD OF THE INVENTION

This invention relates to the fields of position determination and GPS geo-location systems, and, more specifically, to procedures for detecting multi-path conditions which may introduce error into the position determination process.

RELATED ART

The GPS geo-location system is a system of earth orbiting satellites from which entities visible to the satellites are able to determine their position. Each of the satellites transmits a signal marked with a repeating pseudo-random noise (PN) code of 1,023 chips uniquely identifying the satellite. The 1,023 chips repeat every millisecond. The signal is also modulated with data bits, where each data bit has a 20 ms duration in the modulated signal.

FIG. 1 illustrates an application of the GPS geo-location system, whereby subscriber station 100 in a wireless communications system receives transmissions from GPS satellites 102a, 102b, 102c, 102d visible to the station, and derives time measurements from four or more of the transmissions. The station 100 then communicates the measurements to position determination entity (PDE) 104, which determines the position of the station 100 from these measurements. Alternatively, subscriber station 100 determines its own position from these measurements.

The station 100 searches for a transmission from a particular satellite by correlating the PN code for the satellite with a received signal. The received signal is typically a composite of transmissions from one or more satellites visible to the station's receiver in the presence of noise. The correlation is performed over a range of possible shifts of the PN code known as the search window W. Each correlation is performed over an integration time I which may be expressed as the product of $N_c$ and M, where $N_c$ is the coherent integration time, and M is number of coherent integrations which are non-coherently combined.

The correlation values are associated with the corresponding PN code shifts to define a correlation function. Any peaks in the correlation function are located, and compared to a predetermined noise threshold selected so that the false alarm probability is at or below a predetermined value. A time measurement for the satellite is derived from the earliest non-sidelobe peak in the correlation function which exceeds the threshold.

FIG. 2 illustrates a typical correlation function for a GPS satellite. The horizontal axis represents time in terms of chips. The vertical axis represents energy in dB. The correlation function comprises a main lobe 200 and one or more sidelobes 202. The time 206 associated with the peak 204 of the main lobe forms the time measurement for the correlation function.

Due to the asynchronous relationship between the sampling clock and the actual peak, there is often a divergence between the sampled peak of the correlation function and the actual peak. This situation is illustrated in FIG. 3. The sampled peak is identified with numeral 300a, and the actual peak is identified with numeral 304. As can be seen, the two deviate from one another.

An interpolation procedure can be applied to the samples of the correlation function in an effort to better estimate the location of the actual peak. In quadratic interpolation, a quadratic function is fitted to several samples of the correlation function. An interpolated peak is then located from the coefficients of the quadratic function. The interpolated peak is often closer to the actual peak than the sampled peak.

The process of locating the peak of the correlation function is complicated when certain multi-path conditions are present. The reason is that an accurate time measurement is the time associated with the line of sight peak in the correlation function, but the peaks introduced by the multi-path condition may interfere with the line of sight peak, making it difficult or impossible to determine the time associated with this peak.

FIG. 4 illustrates an example of a situation where a line of sight rendering 404 and a multi-path rendering 406 of the same transmission from GPS satellite 400 are received at a GPS receiver within subscriber station 402. The multi-path rendering 406 occurs due to reflection from building 408. The multi-path rendering 406 arrives at the GPS receiver after the line of sight rendering 404 since it must travel a longer distance.

These renderings will introduce multiple peaks in the ensuing correlation function since both renderings are modulated with the same PN code. If the peaks are separated widely in time, typically by 1.5 chips or more, and do not interfere with one another, the time associated with the earlier line of sight peak may be determined and form the time measurement for the correlation function.

However, if the peaks occur close enough in time that they interfere with one another, it may not be possible to determine the time associated with the earlier line of sight peak. In this case, an accurate time measurement may not be possible.

FIG. 5 illustrates an example where the line of sight and multi-path peaks, respectively identified with numerals 506a and 506b, interfere with one another such that, in the resultant correlation function 508, the individual peaks cannot be distinguished from one another or the resultant correlation function. The peak 510 of the correlation function is located and the time 502 associated with this peak forms the time measurement for the correlation function. This value deviates from the time 504 associated with the line of sight peak 506a. Consequently, if the value 502 is used in the position determination process, an erroneous result will ensue.

This error can be significant. Consider histogram 600 of FIG. 6. This histogram illustrates the range of error which can result due to the presence of an interfering multi-path condition. As can be seen, the error can range from about −150 m to 200 m.

This degree of error is inconsistent with the FCC's mandate that subscriber stations, for 911 call purposes, be capable of estimating or having estimated their locations with sufficient accuracy such that the estimates are accurate to within 50 m 68% of the time, and are accurate to within 150 m 95% of the time.

SUMMARY OF THE INVENTION

A method is described of detecting an interfering multi-path condition. An interfering multi-path condition is one in which line of sight and multi-path signals are received sufficiently close in time to one another that the line of sight peak cannot be distinguished from the multi-path peak in the ensuing correlation function. Such multi-path is often referred to as "short" multi-path.

A pulse of a correlation function derived from a received signal is located. Then, a parameter of the pulse is determined. The parameter is analyzed to determine if it is inconsistent with a non-interfering hypothesis. The non-interfering hypothesis is the hypothesis that the pulse is derived from a line-of-sight signal not subject to an interfering multi-path condition.

If the parameter is inconsistent with the non-interfering hypothesis, an interfering multi-path condition is detected.

In one example, a width test is employed to detect an interfering multi-path condition. According to this test, the width of the pulse at a selected energy offset from the peak energy is determined. This pulse width is then compared with a range of possible widths which are characteristic of a non-interfering hypothesis. If the width is outside this range, an interfering multi-path condition is detected.

In a second example, a ratio test is employed to detect an interfering multi-path condition. According to this test, the ratio of the peak energy to the energy at a selected time offset from the peak is determined. This ratio is then compared with a range of possible ratios which are characteristic of a non-interfering hypothesis. If the ratio is outside the range, an interfering multi-path condition is detected.

In a third example, a plurality of ratios is determined, each at a different time offset from the peak. Each ratio is compared to a range of possible ratios which are characteristic of a non-interfering hypothesis. If one ratio is outside its corresponding range, an interfering multi-path condition is detected.

In a fourth example, a combination of the width and ratio tests is employed to detect an interfering multi-path condition. In this example, an interfering multi-path condition is detected if either test is satisfied.

In one application, once an interfering multi-path condition has been detected, any time measurement derived from the correlation function is either discarded or de-weighted in a subsequent position determination process. In another application, once an interfering multi-path has been detected, the correlation function is corrected so that the line-of-sight peak can be distinguished from the other peaks. A time measurement is derived from this peak and used in the position determination process.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 is an example of a lookup table which may be used to implement a width test.

FIG. 9 is an example of a lookup table which may be used to implement a ratio test.

DETAILED DESCRIPTION

As utilized herein, terms such as "about" and "substantially" are intended to allow some leeway in mathematical exactness to account for tolerances that are acceptable in the trade. Accordingly, any deviations upward or downward from the value modified by the terms "about" or "substantially" in the range of 1% to 20% should be considered to be explicitly within the scope of the stated value.

Moreover, as used herein, the term "software" includes source code, assembly language code, binary code, firmware, macro-instructions, micro-instructions, or the like, or any combination of two or more of the foregoing.

Furthermore, the term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

Figure 7:
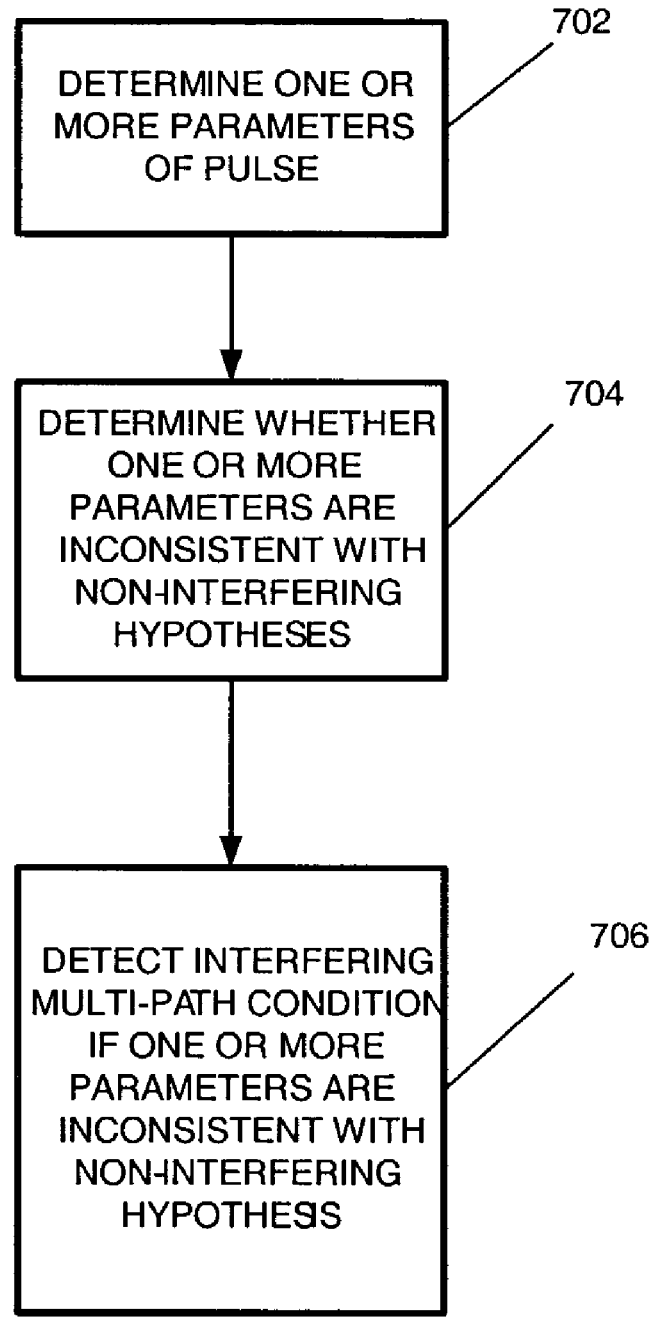
FIG. 7 is a flowchart of an embodiment of a method according to the invention for detecting an interfering multi-path condition.

FIG. 7 is a flowchart illustrating one embodiment of a method according to the invention of detecting an interfering multi-path condition. An interfering multi-path condition is one in which line of sight and multi-path signals are received sufficiently close in time to one another that the line-of-sight peak cannot be distinguished from the multi-path peak in the ensuing correlation function.

The method begins after a correlation function has been derived from a received signal. In one implementation, the received signal is a composite of signals transmitted from one or more GPS satellites visible to the receiver. In this implementation, the correlation function is derived by correlating the received signal with a PN code for one of the satellites over a range of shifts of the PN code within a predetermined search window W.

The method begins in step 702. Step 702 comprises determining one or more parameters of a pulse in the correlation function. In one implementation, the pulse is a potential line-of-sight pulse. A potential line-of-sight pulse is a pulse with may be derived from a line of sight transmission.

Figure 1:
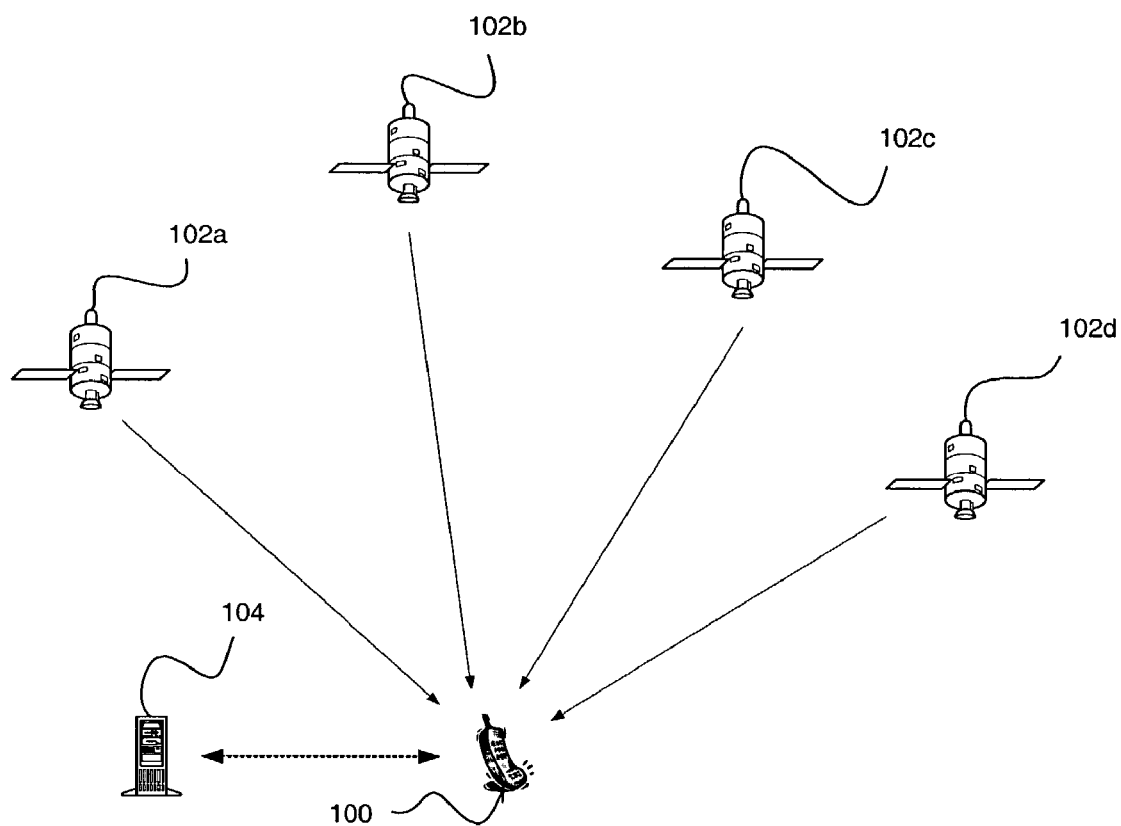
FIG. 1 is a diagram of a GPS geo-location system.
Figure 2:
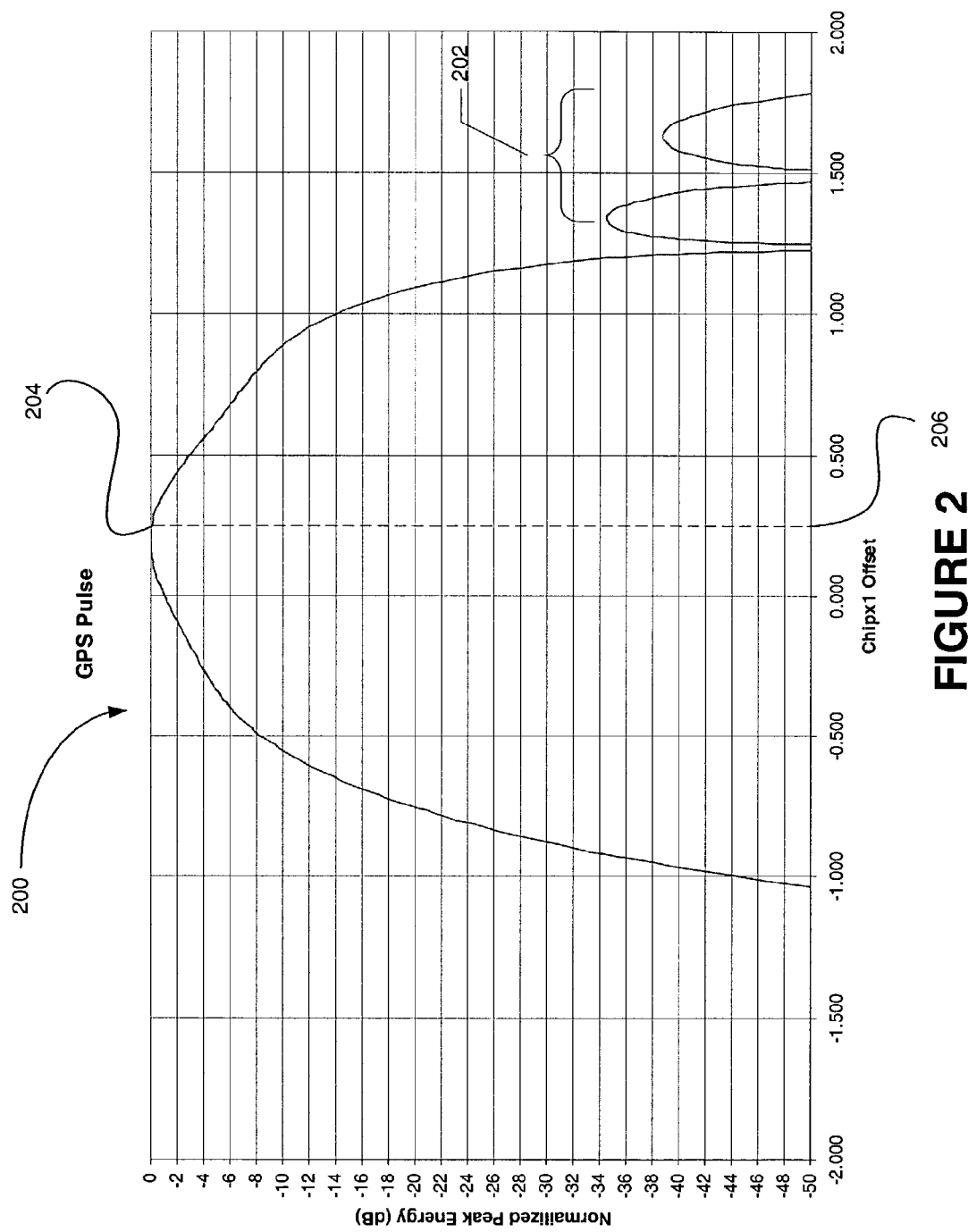
FIG. 2 is an example of a pulse of a correlation function derived from a GPS satellite transmission.
Figure 3A:
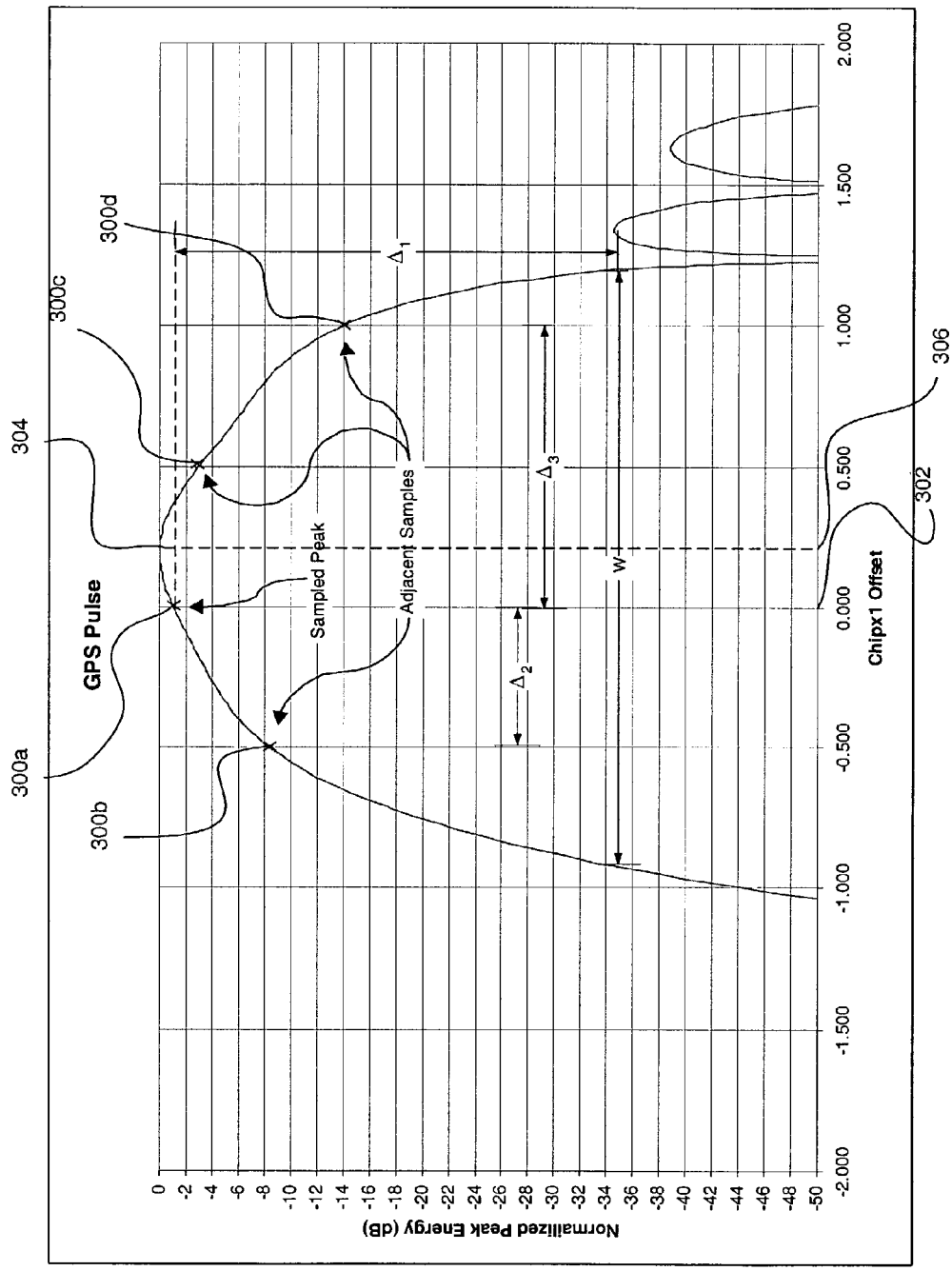
FIG. 3A illustrates various parameters of a pulse in a correlation function resulting from a GPS satellite transmission.

Referring to FIG. 3A, in one embodiment, the parameter determined in step 702 is the width w of the pulse a specified energy offset $\Delta_1$ from the sampled peak energy 303a. Assuming quadratic interpolation is applied to the samples 300a, 300b, and 300c, this width may conveniently be determined from the resulting quadratic coefficients a, b, c in the quadratic formula $y=ax^2+bx+c$.

More specifically, the following formula may be used to determine the width w of the pulse at an arbitrary $K_1$ dB down from the sampled peak:

$$w = 2\sqrt{\frac{y_0}{a}\left(\frac{1-K}{K}\right)} \quad (1)$$

where a is the quadratic coefficient, $y_0$ is equal to $y(-b/2a)$, and K is equal to $$10^{\frac{K_1}{10}}.$$

Alternatively, the following formula may be used to estimate the squared width w* about 1.25 dB down from the sampled peak:

$$w^* = \frac{-c}{a} \quad (2)$$

This formula, unlike (1) above, does not depend on $y_0$ or K, and is therefore computationally efficient.

Referring again to FIG. 3A, in another embodiment, the parameter which is determined in step 702 is the ratio of the sampled peak energy 300a to the sampled energy a selected time offset from the peak. One example of this ratio, associated with the time offset $\Delta_2$, is the ratio of the sampled peak energy 300a to the sampled energy 300b. A second example of this ratio, associated with the time offset $\Delta_3$, is the ratio of the sampled peak energy 300a to the sampled energy 300d.

Returning to FIG. 7, from step 702, the method proceeds to step 704. In step 704, the method determines whether the one or more parameters determined in step 702 are consistent with a non-interfering hypothesis. A non-interfering hypothesis is the hypothesis that the pulse is derived from a line-of-sight signal not subject to an interfering multi-path condition.

From step 704, the method proceeds to step 706. In step 706, an interfering multi-path condition is detected if, in step 704, the one or more parameters are determined to be inconsistent with the non-interfering hypothesis. In one example of step 706, the interfering multi-path condition is indicated by setting a flag.

In one embodiment, step 704 is performed by comparing one or more of the parameters determined in step 702 with a corresponding range of possible values which are characteristic of a non-interfering hypothesis. If a parameter is outside its corresponding range, an interfering multi-path condition is determined to be present.

Figure 3B:
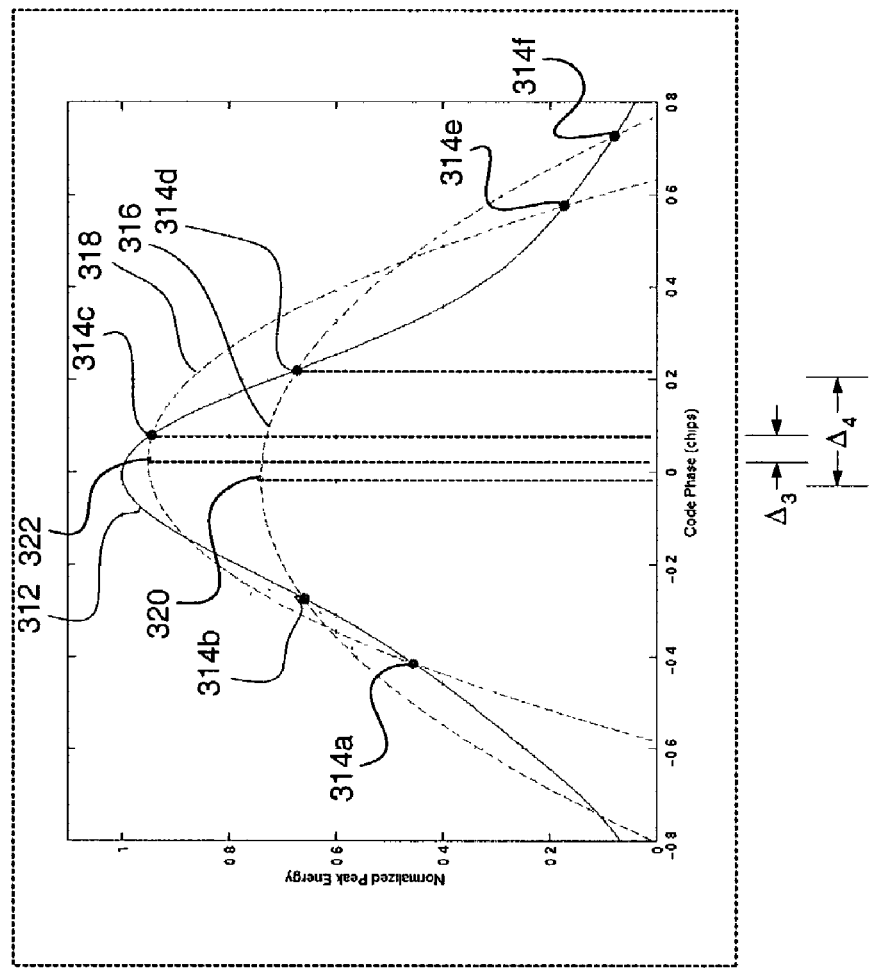
FIG. 3B illustrates examples of peaks interpolated from the samples of a pulse of a correlation function resulting from a GPS satellite transmission.
Figure 4:
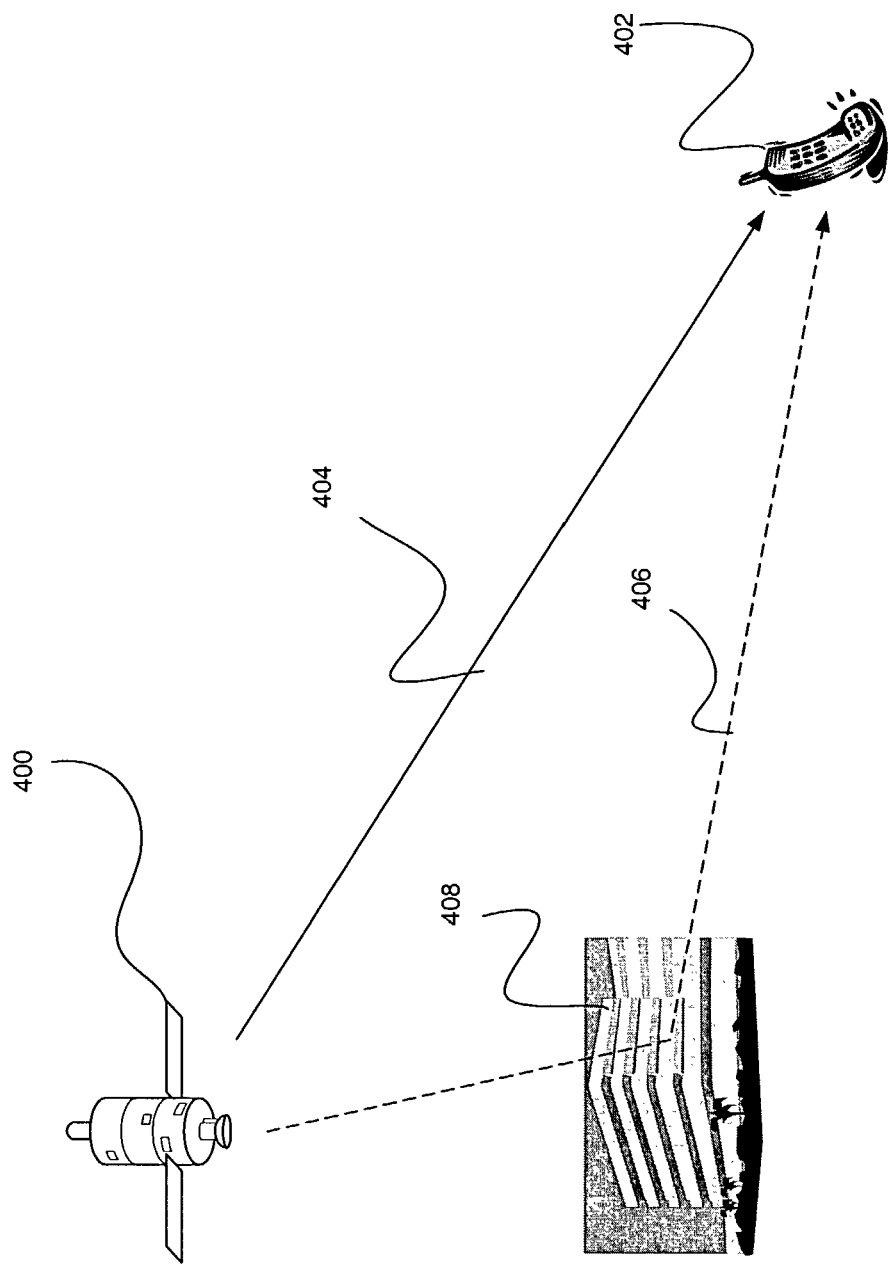
FIG. 4 illustrates the receipt by a subscriber station of line of sight and multi-path renderings of a GPS satellite transmission.
Figure 5:
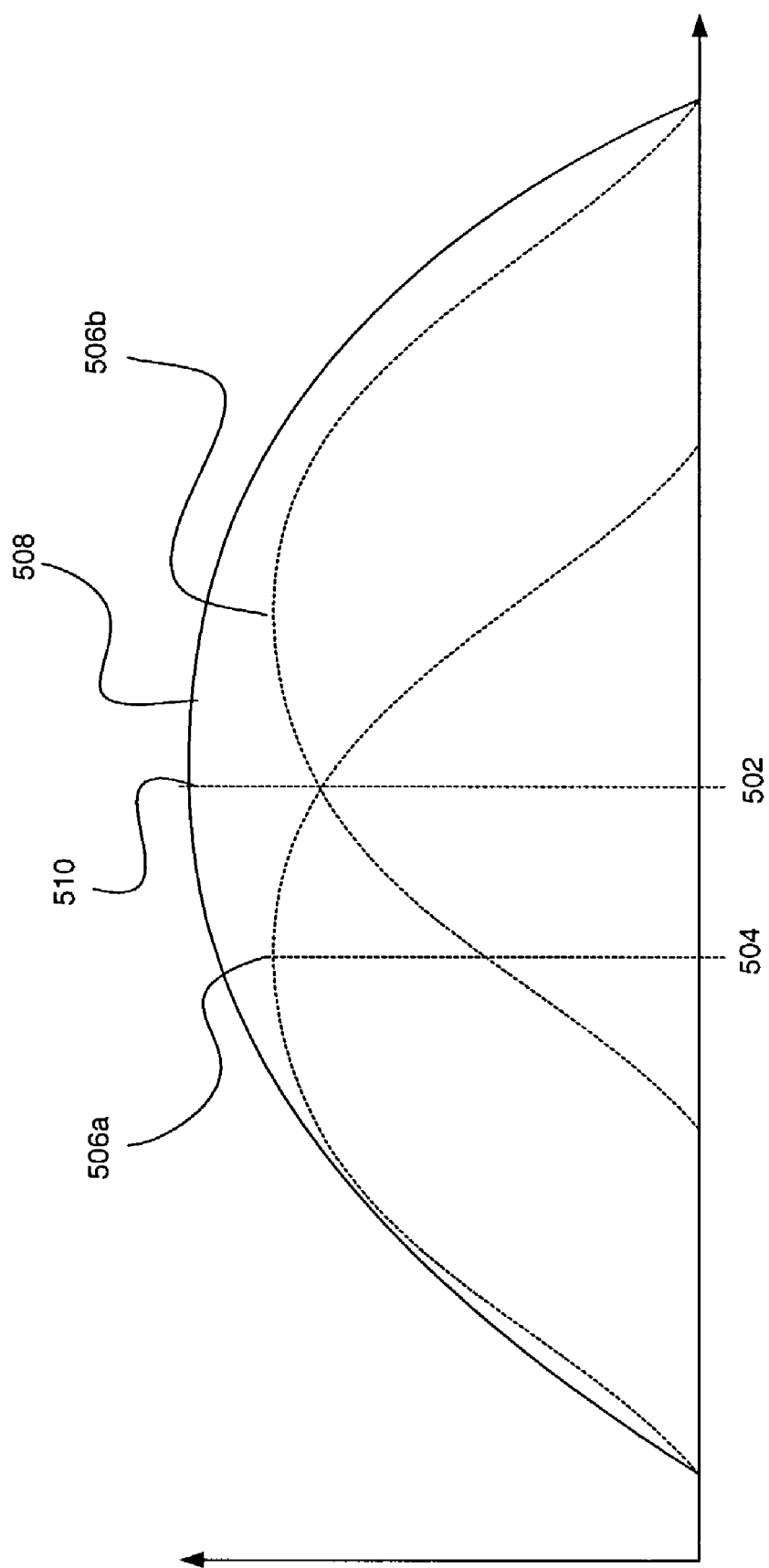
FIG. 5 illustrates the interference which occurs between line of sight and multi-path peaks when an interfering multi-path condition is present.
Figure 6:
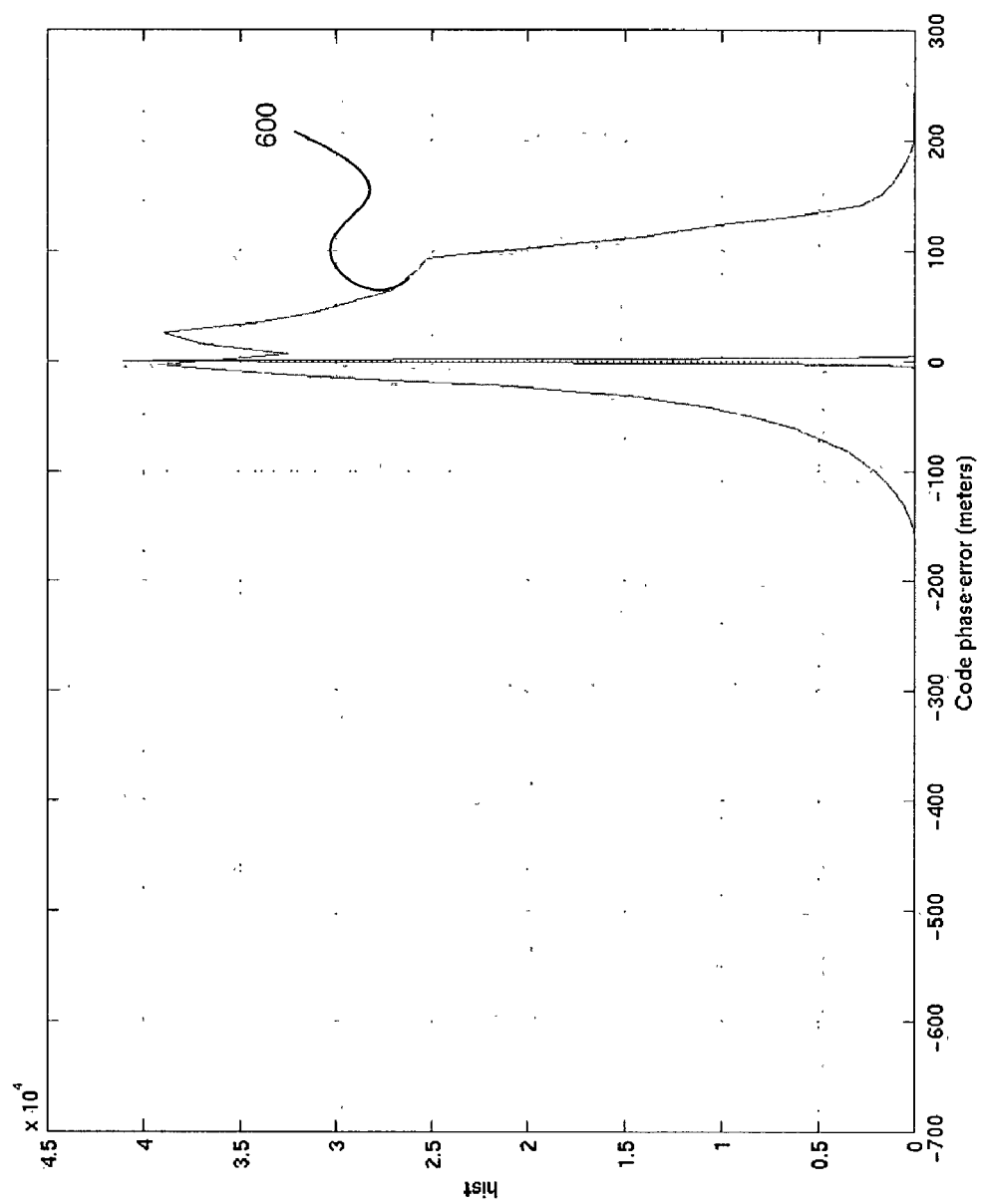
FIG. 6 is a histogram illustrating the range of error which is possible when a position estimate is based on a time measurement derived from a correlation function which is subject to an interfering multi-path condition.

In one implementation of this embodiment, the range which is employed in step 704 has a relationship with and depends on the interpolation offset. In one example, the interpolation offset is the time offset between the interpolated and sampled peaks of a pulse of the correlation function. In FIG. 3B, the interpolation offset $\Delta_3$ is the time offset between the interpolated peak 322, derived by performing quadratic interpolation to the samples 314a, 314c, 314e of the correlation pulse 312, and the sampled peak 314c. Similarly, the interpolation offset $\Delta_4$ is the time offset between the interpolated peak 320, derived by performing quadratic interpolation to the samples 314b, 314d, and 314f of the correlation pulse 312, and the sampled peak 314d.

In one implementation example, the relationship between interpolation offset and the parameter range exists because of the divergence between the shape of the pulse and the shape of a true quadratic function. In FIG. 3B, for example, this divergence exists because the shape of the pulse 312 deviates from that of a parabola, as identified with numerals 316, 318.

In one example, a width test is employed to detect whether there is an interfering multi-path condition. According to this test, quadratic interpolation is applied to the peak sample and the two adjacent samples of the pulse, and the width of the pulse is determined from the coefficients of the resulting quadratic function. The interpolation offset for the pulse is also determined. The interpolation offset is then used as an index to a look-up table. The lookup table is accessed and returns a range of possible widths which are characteristic of a non-interfering hypothesis. The width of the pulse is then compared with this range. If outside the range, an interfering multi-path condition is detected.

FIG. 8 is an example of a lookup table which may employed to implement the width test. Each entry 802a, 802b, 802c in the table is a range of values of the parameter w*. As previously mentioned, the parameter w* is the squared pulse width approximately 1.25 dB down from the sampled peak. It may be computed from the coefficients c and a through application of the formula (2) above.

Each range in the table is characteristic of a non-interfering hypothesis. In this particular example, the non-interfering hypothesis is the hypothesis that the line of sight peak and any multi-path peak in the correlation function are separated by more than 1.5 chips. Each range in the table was determined through simulation. However, it should be appreciated that embodiments are possible where the ranges are determined analytically. It should also be appreciated that these ranges are heavily dependent on the shape of the pulse resulting from the correlation procedure.

There are 20 entries in the table. The first entry 802a is associated with the index 0, the second 802b with the index 1, the third 802c with the index 2, and so on, such that the last entry 802d is associated with the index 19.

To access the table, the interpolation offset is determined from the pulse and mapped into one of these index values. Then, the index is used to retrieve a range from the lookup table. In the particular example illustrated, the mapping is as follows:

| | |
|---|---|
| cpind = 0 | $-0.525 \leq icp < -0.475$ |
| cpind = 1 | $-0.475 \leq icp < -0.425$ |
| cpind = 2 | $-0.425 \leq icp < -0.375$ |
| . | . |
| . | . |
| . | . |
| cpind = 19 | $0.425 \leq icp < 0.475$ |

Here, cpind is the table index, and icp is the measured interpolation offset in terms of chips. Also, values of icp which are less than −0.525 are mapped to cpind=0, and values of icp which equal or exceed 0.475 are mapped to cpind=19. The following pseudo-code also embodies this mapping:

*cpind*=10+*int*((20.0×*icp*)+0.5);

*cpind*=MIN(MAX(*cpind*,0),19);

Applying this pseudo-code, an interpolation offset of 0.2 chips maps to an index of 14. The table entry in FIG. 8 which corresponds to this index value is (1.39718, 2.46252). According to this entry, for an interpolation offset of 0.2 chips, if the computed value of w* is less than 1.39718 or is greater than 2.46252, then the pulse is determined to be inconsistent with a non-interfering hypothesis.

In a second example, a ratio test is employed to detect whether there is an interfering multi-path condition. According to this test, a ratio of the sampled peak energy to the sampled energy a selected time offset from the peak is determined. The interpolation offset is determined and used as an index to a look-up table. The access returns a range of possible ratios which are characteristic of a non-interfering hypothesis. The ratio is compared to the range, and if outside the range, an interfering multi-path condition is detected.

In one embodiment, this process is performed for a plurality of ratios, each associated with a different time offset from the peak. In this embodiment, an access to the lookup table yields a plurality of ranges, one for each of the ratios. An interfering multi-path condition is detected if one of the ratios is outside its corresponding range. Alternatively, it should be appreciated that an embodiment is possible where an interfering multi-path condition is detected only if two or more of the ratios are outside their corresponding ranges.

FIG. 9 is an example of a lookup table which may be employed to implement the ratio test. There are 20 entries in the table. Each entry 904a, 904b, 904c in the table comprises eight (8) ranges 906a, 906b, 906c, each for a different time offset from the peak. Each range is characteristic of a non-interfering hypothesis for a particular time offset. In this particular example, the non-interfering hypothesis is the hypothesis that the line of sight peak and any multi-path peak in the ensuing correlation function are separated by more than 1.5 chips. Each of these ranges was determined through simulation. However, it should be appreciated than an embodiment is possible where the ranges are determined analytically. Again, these ranges are heavily dependent on the shape of the pulse resulting from the correlation procedure.

Each entry in the table is associated with a row index. For example, the first entry 904a is associated with the row index 0, the second entry 904b with the row index 1, and the third entry 904c with the row index 2.

To access the table, the interpolation offset is determined and then mapped into one of the row index values using the identical mapping to that set forth above in relation to the table of FIG. 8.

Next, the time offset used in forming a ratio is mapped into a column index. This column index mapping is as follows:

| | |
|---|---|
| ppind = 0 | 2 chips early |
| ppind = 1 | 1.5 chips early |
| ppind = 2 | 1 chip early |
| ppind = 3 | 0.5 chips early |
| ppind = 4 | 0.5 chips late |
| ppind = 5 | 1 chip late |
| ppind = 6 | 1.5 chips late |
| ppind = 7 | 2 chips late |

Here, ppind refers to the column index. The column index is used to select one of the ranges associated with a row index.

In one application of the foregoing, an interpolation offset of 0.2 chips maps to a row index of 14, and a time offset of 1.5 chips late maps to a column index of 6. The range in FIG. 9 which corresponds to these index values is (7.64650, 23.93000). According to this entry, if a ratio, calculated at an offset of 1.5 chips after the peak and expressed in dB, is less than 7.64650 dB or greater than 23.93000 dB, then the pulse is determined to be inconsistent with a non-interfering hypothesis.

If any one of the eight (8) tests represented by a table entry fails, then the ratio tests fails. However, it should be appreciated than an embodiment is possible in which the ratio test fails only if two or more of the tests fail.

In a third example, both the width and ratio tests are employed. In this example, an interfering multi-path condition is detected if the pulse width is outside the range of possible widths which are characteristic of a non-interfering hypothesis, or if any one of the calculated ratios is outside its corresponding range which is characteristic of a non-interfering hypothesis.

Figure 10:
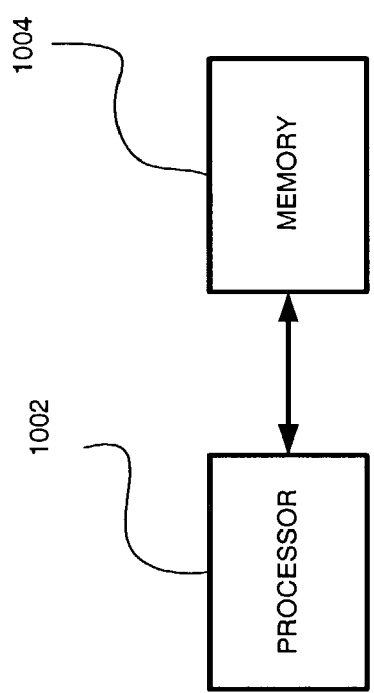
FIG. 10 is a block diagram of an embodiment of a system according to the invention for detecting an interfering multi-path condition.

An embodiment of a system for detecting an interfering multi-path condition is illustrated in FIG. 10. As illustrated, the system comprises processor 1002 and memory 1004. The memory 1004 tangibly embodies a series of instructions for performing the method of FIG. 7, or any of the embodiments, implementations, or examples thereof which have been described or suggested. The processor is configured to access and execute the software instructions tangibly embodied by memory 1004.

In one implementation, a lookup table is stored in memory 1004 which implements a pre-existing relationship between interpolation offset and a parameter range characteristic of an interfering multi-path condition. In this implementation, the processor 1002 determines an interpolation offset for a pulse of a correlation function stored in the memory. Processor 1002 also determines a parameter for the pulse. The processor 1002 uses the interpolation offset to determine a parameter range from the lookup table which is inconsistent with a non-interfering multi-path condition. The processor 1002 compares the parameter to this range, and if outside the range, detects an interfering multi-path condition.

Figure 11:
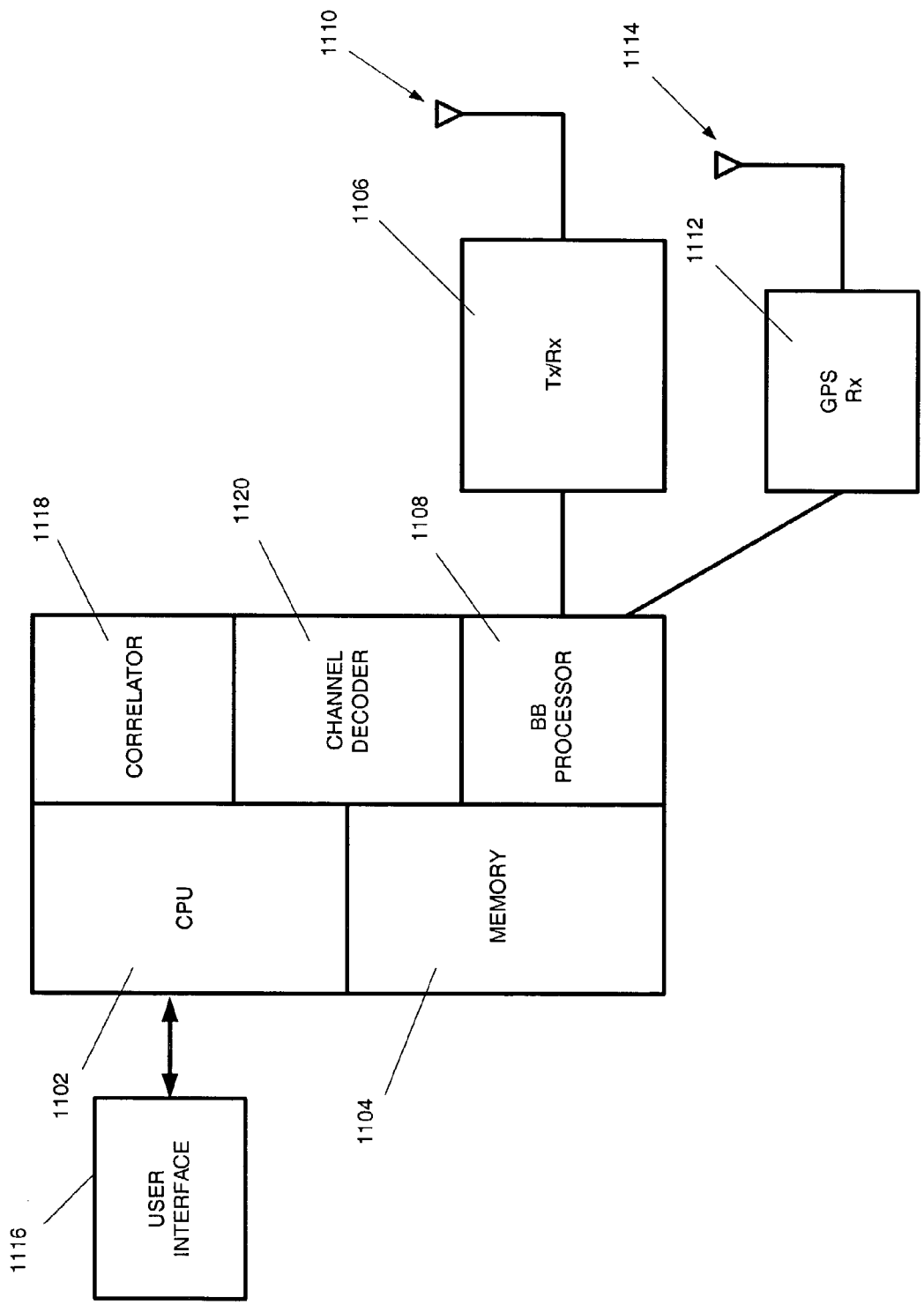
FIG. 11 is a block diagram of a subscriber station in a wireless communications system incorporating or embodying the system of FIG. 10.

An embodiment of a subscriber station in a wireless communication system is illustrated in FIG. 11. This particular subscriber station is configured to embody or incorporate the system of FIG. 10.

Radio transceiver 1106 is configured to modulate baseband information, such as voice or data, onto an RF carrier, and demodulate a modulated RF carrier to obtain baseband information.

An antenna 1110 is configured to transmit a modulated RF carrier over a wireless communications link and receive a modulated RF carrier over a wireless communications link.

Baseband processor 1108 is configured to provide baseband information from CPU 1102 to transceiver 1106 for transmission over a wireless communications link. CPU 1102 in turn obtains this baseband information from an input device within user interface 1116. Baseband processor 1108 is also configured to provide baseband information from transceiver 1106 to CPU 1102. CPU 1102 in turn provides this baseband information to an output device within user interface 1116.

User interface 1116 comprises a plurality of devices for inputting or outputting user information such as voice or data. The devices typically included within the user interface include a keyboard, a display screen, a microphone, and a speaker.

GPS receiver 1112 is configured to receive and demodulate GPS satellite transmissions, and provide the demodulated information to correlator 1118.

Correlator 1118 is configured to derive GPS correlation functions from the information provided to it by GPS receiver 1112. For a given PN code, correlator 1118 produces a correlation function which is defined over a range of code phases which define a search window W. Each individual correlation is performed in accordance with defined coherent and non-coherent integration parameters ($N_c$, M).

Correlator 1118 is also configured to derived pilot-related correlation functions from information relating to pilot signals provided to it by transceiver 1106. This information is used by the subscriber station to acquire wireless communications services.

Channel decoder 1120 is configured to decode channel symbols provided to it by baseband processor 1108 into underlying source bits. In one example, where the channel symbols are convolutionally encoded symbols, the channel decoder is a Viterbi decoder. In a second example, where the channel symbols are serial or parallel concatenations of convolutional codes, the channel decoder 1120 is a turbo decoder.

Memory 1104 in configured to hold software instructions embodying the method of FIG. 7, or any of the embodiments, implementations, or examples thereof which have been described or suggested. CPU 1102 is configured to access and execute these software instructions to detect an interfering multi-path condition in relation to GPS correlation functions provided to it by correlator 1118.

Memory 1104 is also configured to hold one or more lookup tables, each embodying a relationship which exists between interpolation error and a parameter range which is characteristic of an interfering multi-path condition. Examples include a lookup table for implementing a width test and a lookup table for implementing a ratio test. CPU 1102 is configured to access and utilize one or more of these lookup tables to determine a parameter range which corresponds to a particular interpolation offset, and use this range to determine whether an interfering multi-path condition is present.

CPU 1102 is configured to derive measurements from the peaks of the GPS correlation functions provided to it by correlator 1118, and detect whether an interfering multi-path condition in present in relation to any of these peaks using the method of FIG. 7, or any of the variants thereof which have been discussed or suggested.

CPU 1102 is also configured derive time measurements from these peaks, and the root mean square error (RMSE) associated with each of these time measurements.

These measurements and RMSE values are provided to a PDE (not shown). The PDE weights each of the measurements based on the inverse of its corresponding RMSE value, and then estimates the location the subscriber station based on the weighted measurements. Alternatively, the subscriber station determines its own location from this information.

In one embodiment, the CPU 1102 flags time measurements derived from peaks which are subject to an interfering multi-path condition, and these measurements are either ignored or de-weighted in the position determination process. Alternatively, the CPU 1102 corrects the peaks which are subject an interfering multi-path condition so that accurate time measurements may be derived from them. These measurements are then used in the position determination process.

While various embodiments, implementations and examples have been described, it will be apparent to those of ordinary skill in the art that many more embodiments, implementations and examples are possible that are within the scope of this invention. In particular, embodiments are possible where an interfering multi-path condition is detected in relation to signals transmitted by base stations in wireless communications systems, including omni base stations and individual sectors in a multi-sector cell, or signals transmitted by combinations of base stations and GPS satellites. Consequently, the invention is not to be limited except in relation to the appended claims.

What is claimed is:

1. A method of detecting an interfering multi-path condition comprising:

determining two or more parameters of a pulse of a correlation function derived from a received signal, wherein the correlation function is determined by fitting correlation samples based on the received signal to a predetermined function to determine coefficients of the predetermined function, the parameters comprising a peak parameter for a peak of the correlation function and an adjacent parameter for a specified time offset from the peak of the correlation function, wherein the correlation function is capable of being used in determining a position of a receiver that received the signal;

determining an interpolation offset based on the peak of the correlation function and a sampled peak;

determining parameters of a non-interfering hypothesis based on the interpolation offset;

determining if a ratio of the peak parameter and adjacent parameter is inconsistent with the non-interfering hypothesis; and detecting an interfering multi-path condition in the received signal if the ratio is determined to be inconsistent with the non-interfering hypothesis.

2. The method of claim 1 wherein the parameters further comprise the width of the pulse at a specified energy level relative to the peak level determined based on the coefficients of the predetermined function.

3. The method of claim 1 wherein the peak parameter comprises a peak energy, and the adjacent parameter comprises an energy level at the specified time offset from the peak.

4. The method of claim 2 further comprising determining if the pulse width at the specified energy level is outside a range of possible widths which are characteristic of the non-interfering multi-path hypothesis.

5. The method of claim 3 wherein determining if the ratio of the peak parameter and adjacent parameter is inconsistent with the non-interfering hypothesis comprises determining if the ratio is outside a range of possible ratios which are characteristic of the non-interfering hypothesis.

6. The method of claim 4 wherein the range of possible widths is determined from the interpolation offset for the pulse and a pre-existing relationship between the interpolation offset and the range.

7. The method of claim 5 wherein the range of possible ratios is determined from the interpolation offset for the pulse and a pre-existing relationship between the interpolation offset and the range.

8. The method of claim 6 wherein the relationship is implemented as a lookup table.

9. The method of claim 7 wherein the relationship is implemented as a lookup table.

10. A memory storing one or more lookup tables, each embodying a pre-existing relationship between an interpolated peak of a correlation function and parameters of the correlation function, the parameters comprising a peak parameter for a sampled peak of the correlation function, an interpolation offset of a time offset between the interpolated peak and the sampled peak, and an adjacent parameter for a specified time offset from the sampled peak of the correlation function, the pre-existing relationship being characteristic of a non-interfering multi-path condition.

11. The memory of claim 10 wherein the lookup tables further embody a pre-existing relationship between the width of the correlation function at a specified energy level relative to the peak energy level that is characteristic of a non-interfering multi-path condition.

12. The memory of claim 10 wherein the pre-existing relationship is the ratio of peak energy to an energy level located at the specified time offset from the peak.

13. A system comprising a processor and the memory of claim 10, where the processor is configured to access the one or more lookup tables stored in the memory, and thereby determine whether an interfering multi-path condition is present in relation to a pulse of a correlation function stored in the memory.

14. A memory storing a sequence of software instructions embodying a method of detecting an interfering multi-path condition, the method comprising:

determining two or more parameters of a pulse of a correlation function derived from a received signal, wherein the correlation function is determined by fitting correlation samples based on the received signal to a predetermined function to determine coefficients of the predetermined function, the parameters comprising a peak parameter for a peak of the correlation function and an adjacent parameter for a specified time offset from the peak of the correlation function, wherein the correlation function, is capable of being used in determining a position of a receiver that received the signal;

determining an interpolation offset based on the peak of the correlation function and a sampled peak;

determining parameters of a non-interfering hypothesis based on the interpolation offset;

determining if a ratio of the peak parameter and adjacent parameter is inconsistent with the non-interfering hypothesis; and detecting an interfering multi-path condition in the received signal if the ratio is determined to be inconsistent with the non-interfering hypothesis.

15. The memory of claim 14 wherein the parameters further comprise pulse width at a specified energy level relative to the peak level.

16. The memory of claim 15 further comprising determining if the pulse width at the specified energy level is outside a range of possible widths which are characteristic of the non-interfering multi-path hypothesis.

17. The memory of claim 16 wherein the range of possible widths is determined from the interpolation offset for the pulse and a pre-existing relationship between the interpolation offset and the range.

18. The memory of claim 17 wherein the relationship is implemented as a lookup table.

19. The memory of claim 14 wherein the peak parameter comprises a peak energy, and the adjacent parameter comprises an energy level at the specified time offset from the peak.

20. The memory of claim 19 wherein determining if the ratio of the peak parameter and adjacent parameter is inconsistent with the non-interfering hypothesis determining if the ratio is outside a range of possible ratios which are characteristic of the non-interfering hypothesis.

21. The memory of claim 20 wherein the range of possible ratios is determined from the interpolation offset for the pulse and a pre-existing relationship between the interpolation offset and the range.

22. The memory of claim 21 wherein the relationship is implemented as a lookup table.

23. A system comprising a processor and the memory of claim 14, wherein the processor is configured to access and execute the software instructions stored in the memory, and thereby determine whether an interfering multi-path condition is present in relation to a pulse of a correlation function stored in the memory.

24. A method of detecting an interfering multi-path condition comprising:

a step for determining two or more parameters of a pulse of a correlation function derived from a received signal, wherein the correlation function is determined by fitting correlation samples based on the received signal to a predetermined function to determine coefficients of the predetermined function, the parameters comprising a peak parameter for a peak of the correlation function and an adjacent parameter for a specified time offset from the peak of the correlation function, wherein the correlation function is capable of being used in determining a position of a receiver that received the signal;

a step for determining an interpolation offset based on the peak of the correlation function and a sampled peak;

a step for determining parameters of a non-interfering hypothesis based on the interpolation offset;

a step for determining if a ratio of the peak parameter and adjacent parameter is inconsistent with the non-interfering hypothesis; and a step for detecting an interfering multi-path condition in the received signal if the ratio is determined to be inconsistent with the non-interfering hypothesis.

25. An apparatus for detecting an interfering multi-path condition, comprising:

means for determining two or more parameters of a pulse of a correlation function derived from a received signal, wherein the correlation function is determined by fitting correlation samples based on the received signal to a predetermined function to determine coefficients of the predetermined function, the parameters comprising a peak parameter for a peak of the correlation function and an adjacent parameter for a specified time offset from the peak of the correlation function, wherein the correlation function is capable of being used in determining a position of a receiver that received the signal;

means for determining an interpolation offset based on the peak of the correlation function and a sampled peak;

means for determining parameters of a non-interfering hypothesis based on the interpolation offset;

means for determining if a ratio of the peak parameter and adjacent parameter is inconsistent with the non-interfering hypothesis; and means for detecting an interfering multi-path condition in the received signal if the ratio is determined to be inconsistent with the non-interfering hypothesis.

26. A method of detecting an interfering multi-path condition comprising:

sampling a received signal to generate a plurality of sampled signals;

correlating the sampled signals to a predetermined PN code to generate a plurality of correlation samples;

determining a correlation function based on fitting a quadratic function to the correlation samples;

determining an interpolation offset based on a peak of the correlation function and a sampled peak;

mapping the interpolation offset to two or more parameters of a pulse of the correlation function;

determining values for the two or more parameters of the pulse of the correlation function based on coefficients of the correlation function;

determining if a relationship between at least two of the parameters is inconsistent with a non-interfering hypothesis; and detecting an interfering multi-path condition in the received signal if the relationship is determined to be inconsistent with the non-interfering hypothesis.

* * * * *

UNITED STATES PATENT AND TRADEMARK OFFICE
CERTIFICATE OF CORRECTION

PATENT NO. : 7,657,230 B2 Page 1 of 1
APPLICATION NO. : 10/233096
DATED : February 2, 2010
INVENTOR(S) : Douglas N. Rowitch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Twenty-eighth Day of December, 2010

David J. Kappos
*Director of the United States Patent and Trademark Office*